United States Patent
Gatta et al.

(10) Patent No.: US 10,232,899 B1
(45) Date of Patent: Mar. 19, 2019

(54) VIRTUAL STOP STATION

(71) Applicant: R.P. Gatta, Inc., Aurora, OH (US)

(72) Inventors: Raymond P. Gatta, Aurora, OH (US);
Wes Graham, Aurora, OH (US);
Matthew L. Myers, Aurora, OH (US);
Todd Van Dyke, Aurora, OH (US)

(73) Assignee: R.P. GATTA, INC, Aurora, OH (US)

( * ) Notice: Subject to any disclaimer, the term of this patent is extended or adjusted under 35 U.S.C. 154(b) by 593 days.

(21) Appl. No.: 14/824,003

(22) Filed: Aug. 11, 2015

(51) Int. Cl.
| | |
|---|---|
| B62D 65/18 | (2006.01) |
| B65G 37/00 | (2006.01) |
| B62D 65/06 | (2006.01) |
| B62D 65/02 | (2006.01) |

(52) U.S. Cl.
CPC ........... *B62D 65/18* (2013.01); *B62D 65/022* (2013.01); *B62D 65/06* (2013.01); *B65G 37/00* (2013.01)

(58) Field of Classification Search
CPC ............. Y10T 29/5122; Y10T 29/5124; Y10T 29/5136; Y10T 29/5137; Y10T 29/5191
See application file for complete search history.

(56) References Cited

U.S. PATENT DOCUMENTS

| | | |
|---|---|---|
| 8,276,744 B2 | 10/2012 | Basalia |
| 8,700,205 B2 | 4/2014 | Scheuerman et al. |
| 2013/0014370 A1* | 1/2013 | Shimizu ................. B62D 65/06 29/426.2 |

* cited by examiner

*Primary Examiner* — Jason L Vaughan
*Assistant Examiner* — Amanda J Meneghini
(74) *Attorney, Agent, or Firm* — John D. Gugliotta

(57) ABSTRACT

A virtual stop station is provided having a carriage straddling an assembly line operation. This provides an independently moving platform upon which one or more manufacturing robots are affixed. The carriage is coordinated with and tracked to the linear motion of the assembly line. A vision guidance system centers the workpiece, and lifting arms mounted on the moving carriage will locate the workpiece and lift the workpiece up off of the conveyor, while being coordinated with it. The workpiece and robots thus are now fixtured to the same frame, thus eliminating movement relative to one another creating a virtual stop station. Once subassembly is complete, the coordinated robotic gantry will disengage from the conveyor and return home. The instant abstract is neither intended to define the invention disclosed in this specification nor intended to limit the scope of the invention in any way.

25 Claims, 5 Drawing Sheets

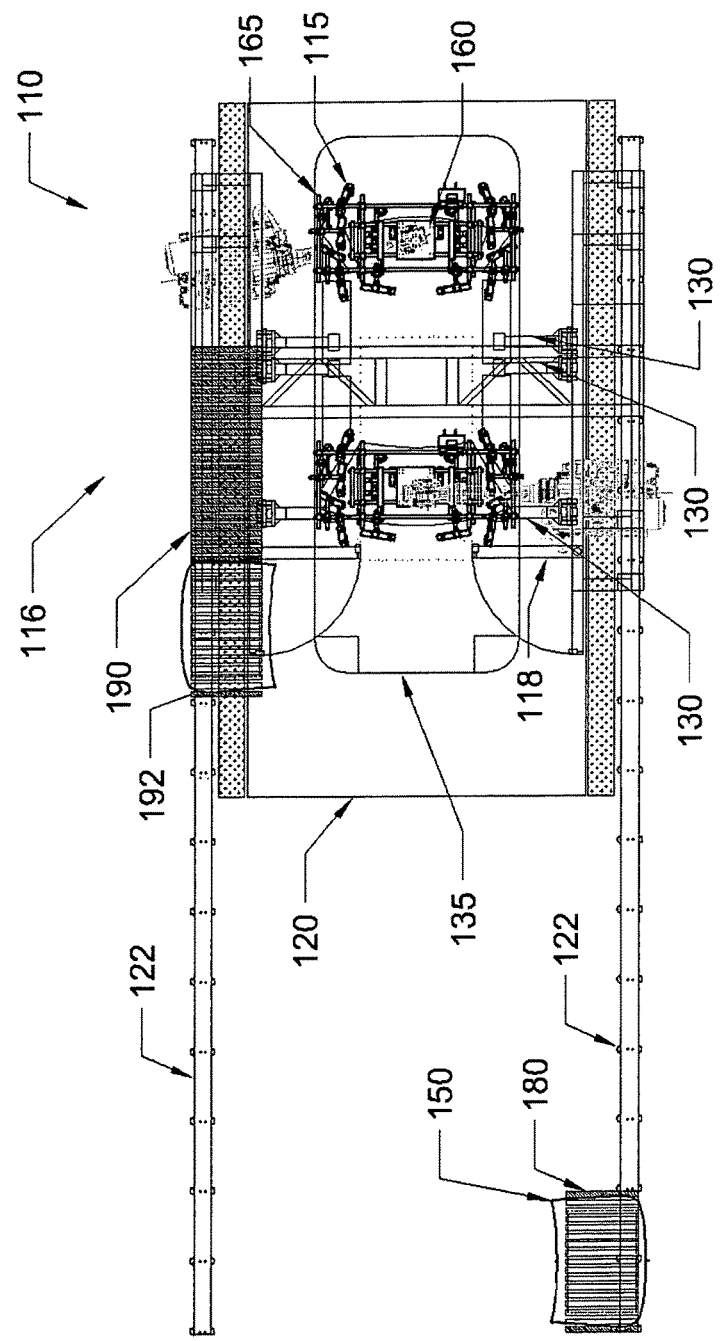

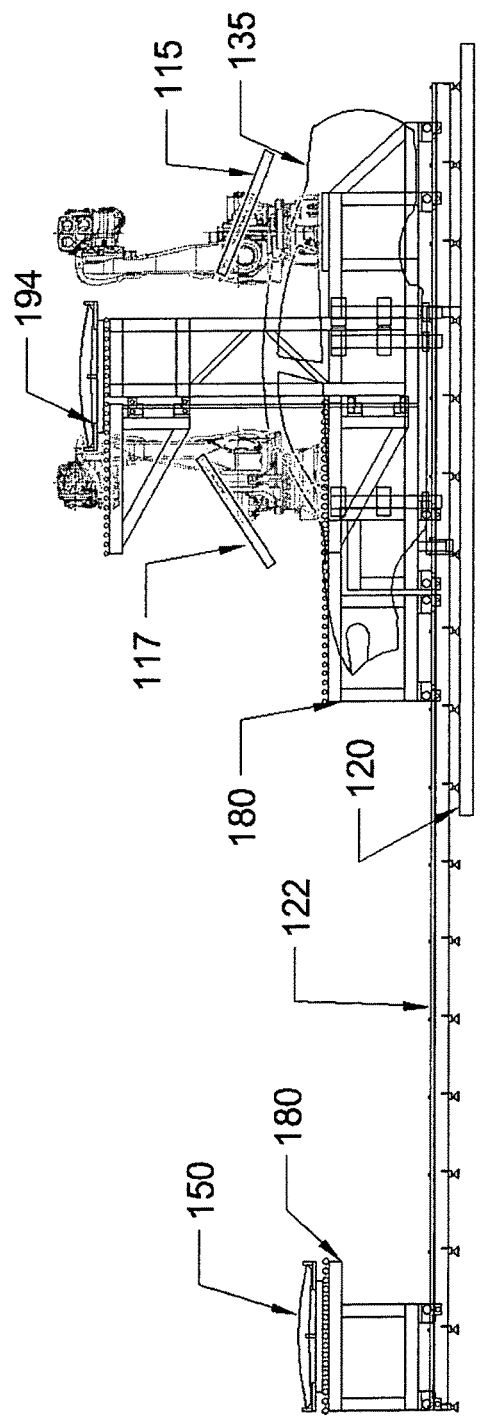

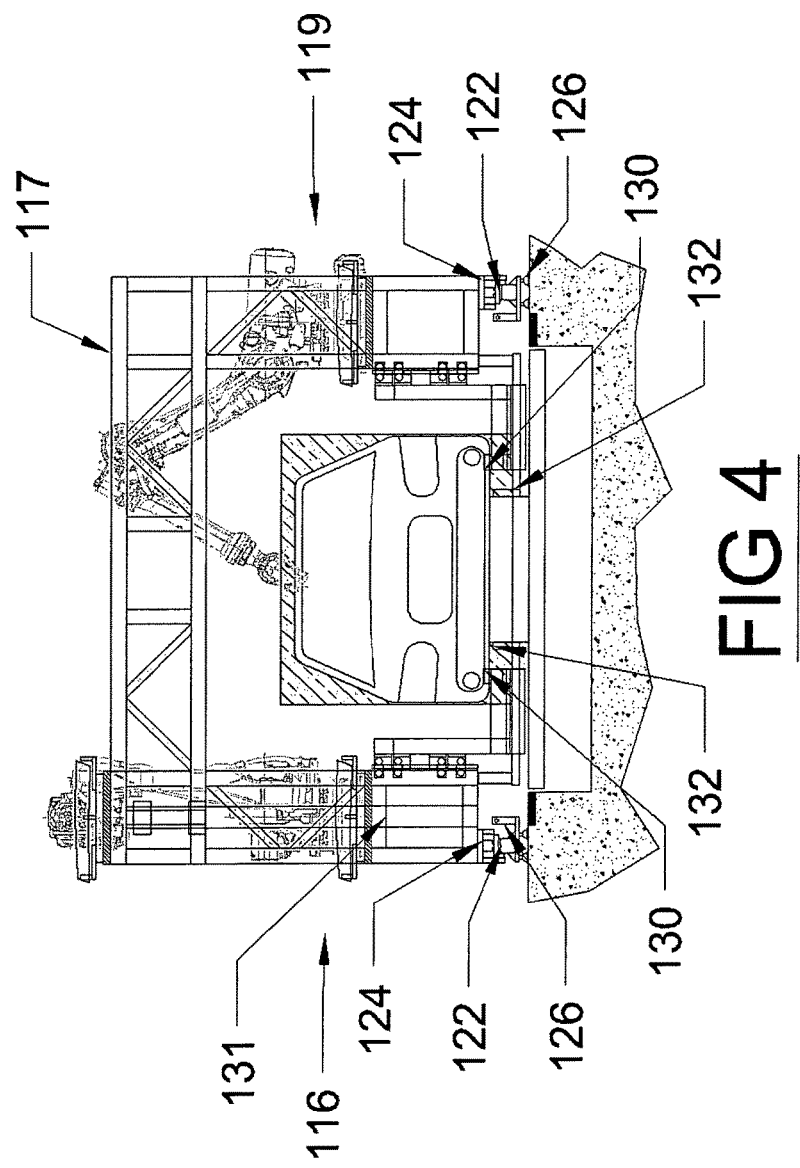

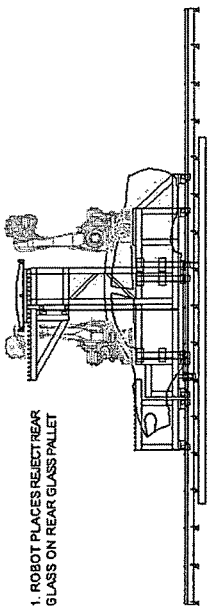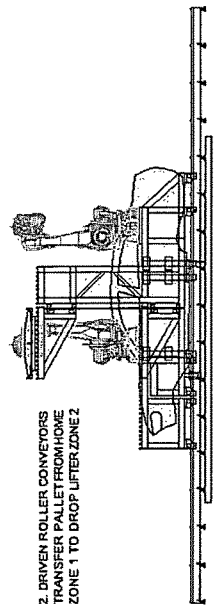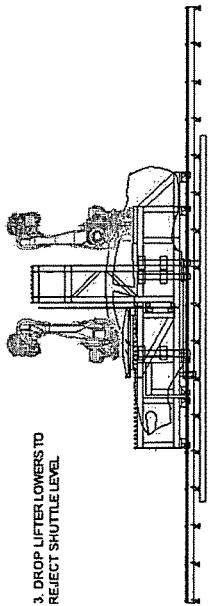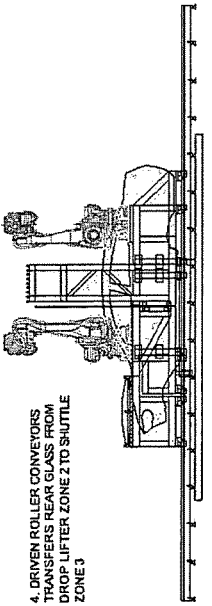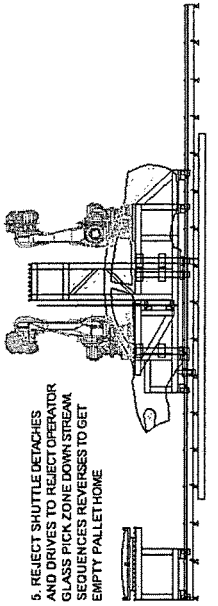

VIRTUAL STOP STATION

RELATED APPLICATIONS

There are no previously filed, nor currently any co-pending applications, anywhere in the world.

BACKGROUND OF THE INVENTION

1. Field of the Invention

The present invention relates generally to manufacturing assembly lines and, more particularly, to a system and method for increasing the adaptability of an assembly line for the progressive assembly of manufactured goods.

2. Description of the Related Art

An assembly line is a manufacturing process in which parts are added as a semi-finished assembly or workpiece moves from work station to work station. Since its innovation in 1901 by the Olds Motor Vehicle Company, and its improvements by Henry Ford in 1913, assembly lines have become the common method of assembling complex items such as automobiles and other transportation equipment, household appliances and electronic goods.

The innovations of Henry Ford continue to exist today in automobile production. By mechanically moving the parts to the assembly work and moving the semi-finished assembly from work station to work station, the sequential assembly of such complex finished goods can be produced faster, with higher quality and with less labor than by any other means.

In current production environments, the sequentially finished goods are timed to and move with various types of conveyors. A huge limitation of such systems is that the "line" moves at a certain speed and, as such, all the goods on the line are moving at the same pace. This becomes a problem when a particular assembly subprocess is more complex or time consuming than would be otherwise dictated by the pace of the line.

One solution to this problem that is currently applied is to insert a "stop station" into the moving assembly line. Most often, currently when a robotic automated assembly process is inserted in an assembly line, a stop station is required. This may be accomplished by cutting out a section of the moving assembly conveyor line, and inserting new sections of conveyor. The first inserted conveyor section is capable of matching the in-feeding assembly line conveyor velocity until an entire vehicle subassembly has conveyed onto this conveyor section. Then this conveyor section speeds up the conveyance of the vehicle subassembly onto another conveyor section that at a higher conveyance speed. Once the vehicle subassembly is on this second section of conveyor, it stops the vehicle subassembly for the robotic assembly process. After the robotic assembly process is completed, this section of conveyor reverts back to the high conveyance speed to convey the vehicle subassembly out of the stop station while conveying in the next vehicle subassembly into the robotic automation station. When the vehicle subassembly has completely exited the robotic automation station onto a third section of conveyor, this conveyor drops its conveyance speed to match the conveyance velocity to the remaining portion of the moving assembly line.

The use of Stop Stations is not without drawbacks. There is a cost associated with inserting these new conveyor sections into the moving assembly line. Further, this method requires three vehicle subassembly work stations to insert a robotic automation station into the existing moving assembly line compared to one work station to be performed manually. Assembly line space is a premium where often the entire length of the assembly line is already dedicated to other assembly line processes.

An alternate solution to the use of a Stop Station is the application of Moving Line Encoder Feedback. For robotic assembly applications, an assembly line encoder feedback may be utilized in which an encoder feeds back the position of the vehicle subassembly position to the robot controller, and the robot synchronizes with the speed of the conveying vehicle subassembly.

A problem with this method is that the encoder is coupled to the assembly line conveyor drive which is often a great distance away from the Robotic Automation station. Because the assembly line conveyors in such a configuration may be chain driven conveyors, the backlash in the chain combined with chain wear elongation causes the feedback positioning to be very inaccurate. Further, when the assembly lines stops and starts which is a normal occurrence in the automotive assembly process, the chain backlash may shift causing even greater inaccuracy during acceleration and decelerations of the assembly line. Also, there is a cost associated with running electrical cable the long distance from the encoder to the robot controller(s). Further still, because automotive moving assembly lines are meant for manual assembly processes, the vehicle subassembly as it conveys down the line is constantly changing its position in space in all 6 degrees of freedom. The encoder feedback only gives position in the direction of the flow of the vehicle subassembly as it conveys down the line, or in one of the six degrees of freedom.

All of the above solutions have drawbacks.

It is preferable for purposes of quality, productivity and safety that the availability of "stop stations" be capable of implementation without the need to consume acceleration/deceleration lengths of manufacturing space. Further, it is preferable that stop station subassembly be implemented without decoupling the work from the assembly line. Further still, it is preferable that such improvements allow for robotic assembly cells to be integrated within such solutions.

Consequently, a need has been felt for providing a "virtual" stop station within a progressive assembly line manufacturing environment.

SUMMARY OF THE INVENTION

It is therefore objects of the present invention to provide an improved stop station assembly system as for implementation within new or existing progressive assembly line manufacturing environment.

It is further objects of the present invention to provide progressive subassembly production systems capable of tracking to new or existing assembly line conveyors.

It is a feature of the present invention to provide a "virtual" stop station that may be adaptably integrated within many assembly line environments.

Briefly described according to the present invention, a system and method for implementation of robotic manufacturing assembly is provided. A gantry carriage is provided straddling an assembly line operation. The gantry carriage provides an independently moving platform upon which one or more manufacturing robots may be affixed. The gantry carriage is coordinated with the assembly line and may begin tracking directly by being mechanically engaged to the conveyor, thus with the linear motion of the assembly line when the workpiece enters the gantry carriage station.

The speed and motion of the gantry station may match the assembly line speed regardless of changes in speed or acceleration. A vision robot guidance system is used to center the workpiece, and lifting arms mounted on the moving carriage will locate the workpiece and lift the workpiece up off of the conveyor, while coordinating with it. The workpiece, robots and camera (vision) are all now fixtured to the same frame, thus eliminating movement relative to one another creating a virtual stop station. Assembly work may then proceed within the virtual stop station independent of the assembly line operation, and when complete the robots retract to their clear of line positions and the lifting arms will then lower the workpiece back onto the conveyor details. Once clear of the workpiece the coordinated robotic gantry will disengage from the conveyor and return home. Once the carriage is home, the robots will use vision guidance to center and pick the workpiece and repeat the cycle.

It is an advantage of the present invention that a virtual stop station may be implemented without modification to an otherwise existing assembly line.

It is another advantage of the present invention that a stop station may be implemented without taking up additional pitches of assembly line space. The lines space along the assembly line of the present invention may often equal the current line space required to manually preform the assembly process, which is increasingly advantageous where the entire length of the assembly line is already dedicated to other assembly line processes.

It is yet another advantage of the present invention that improved manufacturing quality may be achieved by increasing the applicability of robotic assembly utilization within the progressive assembly line manufacturing environment. Productivity increases by eliminating labor may further be achieved. Further, by eliminating a difficult manual assembly process, often ergonomic and safety improvements are realized.

It is still another advantage of the present invention to reduce the overall cost of the robotic automation, especially where existing assembly line conveyors do not require other modifications.

It still another advantage of the present invention to reduce potential down time events or line pauses, and accordingly reduce cycle time.

It should be noted that the present invention provides numerous innovations, one of which includes the ability to place a manufacturing stop station anywhere within an assembly line environment without the space required to accelerate and decelerate the workpiece. Within such a virtual stop station can be accommodated such current state of the art limitations in automated manufacturing and assembly without concern about variations in positioning of the workpiece relative to subsequent continuous processing equipment. As such, it should further be noted that the present invention is in no way limited to this current state of the art, and various adaptations that may evolve to accommodate future developments in the art of material handling in such manufacturing systems should be considered a design choice within the range of equivalents of the present invention.

Further objects, advantages, features and results of the invention will become more fully apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a partial top plan view thereof showing a gantry carriage for use therewith;

FIG. 3 is a side elevational view thereof;

FIG. 4 is a front elevational view thereof; and

FIG. 5a through FIG. 5e are side elevational views thereof showing a method of operating a virtual stop station within a manufacturing cell improvement.

DESCRIPTION OF THE PREFERRED EMBODIMENTS

Figure 1:
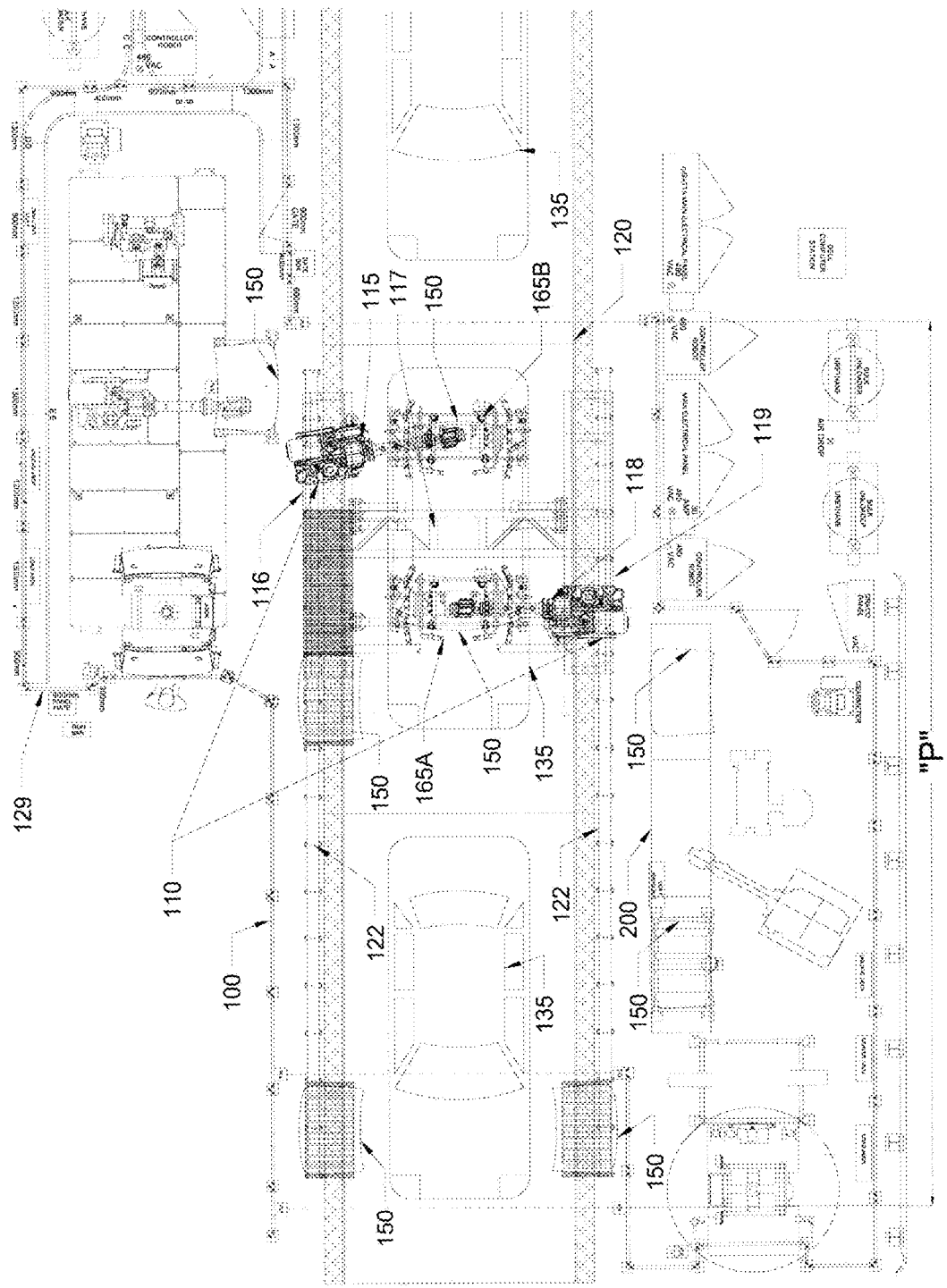
FIG. 1 is a top plan view of an automated glass decking manufacturing cell embodying a preferred embodiment of a virtual stop station according to the present invention.

For purposes of the present invention, the terms "a" and "an" herein do not denote a limitation of quantity, but rather denote the presence of at least one of the referenced items.

For purposes of the present invention, the term "anticipate" or "anticipated" should not be construed as a legal term of art in the context of prior invention or disclosure, but rather more generally in the colloquial or common usage sense as meaning expected, or given advance thought or future treatment.

For purposes of the present invention, the term "encoder" should be interpreted broadly as any mean for converting information from one format or code to another, and may be a device, circuit, transducer, software program, algorithm or person that converts such information for the purposes of standardization, speed, secrecy, security or compressions. As used herein may be a rotary encoder converts rotary position to an analog (e.g., analog quadrature) or digital (e.g., digital quadrature, 32-bit parallel, or USB) electronic signal, but need not be limited only to such uses. Such encoders may be either absolute or incremental, with a signal from an absolute encoder gives an unambiguous position within the travel range without requiring knowledge of any previous position. The signal from an incremental encoder may becyclical, thus ambiguous, and requires counting of cycles to maintain absolute position within the travel range. Both can provide the same accuracy, but the absolute encoder is more robust to interruptions in transducer signal.

For purposes of the present invention, the term "fixture", "fixtured" or "fixturing" referrer broadly to connecting of a workpiece to an identified point on a piece of equipment such that the fixed position of a workpiece and any point on the workpiece may be subsequently known for future reference and use.

For purposes of the present invention, the term "gantry" is intended to be broadly construed as a bridgelike overhead structure, assembly, platform or framework that supports equipment and moves overhead of an assembly line operation. The term "gantry" is not intended to imply any particular and specific physical structure or arrangement of support members, but is to be broadly construed to include a carriage that straddles the assembly line either overhead or beneath the conveyor.

For purposes of the present invention, the term "pitch" is a term that generally describes a distance between or spacing of workpieces on a line conveyor. As used throughout the preferred embodiment herein, a "pitch" spacing is determined by measuring from the center of a vehicle workpiece subassembly to the center of an adjacent (i.e. either in front of or behind) vehicle workpiece subassembly on an assembly line conveyor.

For purposes of the present invention, the term "racking" is used to describe, generally, an uneven forward motion of a gantry type carriage or assembly. More specifically, "racking" occurs when one lateral side of the carriage moves more lateral forward or backward than the opposite lateral side of the carriage.

For purposes of the present invention, the term "skewing" is used synonymously or interchangeably with the term "racking". "Racking" and "skewing" results in uneven motion of gantry carriage, which is generally desired to be reduced or eliminated.

For purposes of the present invention, the term "skillet assembly line" or "skillet conveyor" is used to describe a conveyor system mounted on the floor or in a pit of a production area such as to allowing people and product to ride on a continuous train of platforms as the conveyor moves smoothly down the assembly line. Sometimes called a platform conveyor, the "skillets" are arranged in a positive contact, accumulated manner, creating the effect of a moving floor. Such a type of conveyor system provides a synergy between people, processes, and technology and, for further purposes of the present invention, the use of such terminology within the detailed description of the invention should be used exemplary only and should be considered broadly to be any type of progressive assembly line, utilizing any type of conveyor for progressing an assembled workpiece including, but not limited to, chain conveyors, belt conveyors, overhead conveyors or other similar or equivalent material handling technology or other material handling systems for assembly automation.

For purposes of the present invention, the term "urethane cell" is used to describe any the application of a urethane water sealer around the perimeters of front or rear vehicle glass. The term "urethane cell" as used herein is directed toward a robotic application of such sealer. While such sealers currently used within the state of the art are urethane based materials, it is intended that the such usage not be limiting, but rather a mere design choice.

For purposes of the present invention, the term "vector duty" or "vector duty motor" should be broadly construed as a variable speed motor to provide constant torque over a wide speed range (including low speed) while operating on variable frequency drive power. Such motors achieve full torque at near zero speed as well as over a wide speed range. A vector duty motor may include a feedback device for use in a closed or open loop feedback system. As used herein, the use of a vector duty motor or a servo motor should both be considered broadly within the same range of equivalents.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

In light of the breadth of the range of equivalents, and for purpose of clarity of enablement, the present invention shall be disclosed and described in reference to an exemplary application for use in conjunction with a specific manufacturing application. As described herein and shown generally in conjunction with FIG. 1, the application of the principals and features of the present invention shall be described as applied to the automation of a glass decking cell 100 with an automotive assembly line environment.

As shown in conjunction with FIG. 2-4, a dual robot coordinated gantry assembly is shown, generally noted as 110, is shown implementing the inventive concepts of the present invention in the automation of a glass decking manufacturing cell. A first assembly robot 115 is mounting on a first side 116 of a moving assembly line synchronizing gantry carriage 117, and a second assembly robot 118 is mounted on a second side 119 of the moving gantry carriage 117. In the present application the two robots 115, 118 were selected as Fanuc R-2000iC/165F robots. However, while the general selection of a multipurpose automated robot is intended to be used in conjunction with the present invention, such as specific selection of multipurpose intelligent robot was generally a design choice within this limitation and, as such, should not be considered limiting.

The robots 115, 118 are mounted on a moving gantry carriage 117. The gantry carriage 117 is positioned to straddle a skillet conveyor assembly line 120 with one such robot mounted on each side of the line 120 such that each robot can automatically pick glass 150 with from the existing urethane installation cells of an existing assembly line. The gantry 117 and robots 115, 118 are positioned such as to maximize their reach and clearance to the vehicle. It should be noted that the number and positioning of the robots 115,118 about the gantry carriage 117 should not be limited to such a specific number and configuration. As should be apparent to a person having ordinary skill in the relevant art, the use of one or more robots, mounted on the same or either side of the gantry carriage, in light of the present invention, should be considered a design choice subject to, inter alia, the intended workpiece, the type of assembly, and the needs of both the manufacturer and limitation imposed on the automation integrator.

In any configuration, it is intended that such a robot coordinated gantry carriage 117 may be implemented in conjunction with the skillet line 120 without significant disruption to an existing assembly process. According to an aspect of the present invention, modification required to the skillet line in such an exemplary application may reuse any existing urethane cells 129, with only minor interface modifications. Such an installation will require no more than the current two pitches "P" of line space currently required for such an existing manual assembly of windshield and backglass to the vehicle subassembly.

In any desired configuration, the robot gantry carriage 117 will straddle the skillet line 120 via a pair of floor mounted tracks or rails 122. The rails 122 are mounted parallel to or concomitant with the skillet line 120. The use of heavy duty crowned yoke rollers 124 may be use to allow the carriage 117 to ride on top of a hardened steel track 122 to accommodate lateral locomotion of the carriage 117 in conjunction with the movement of the line 120. Side guide rollers 126 may be further used to capture the steel track 120 to prevent lateral deflection.

Travel of the carriage 117 along the rails 120 is due to two pneumatically actuated arms mounted on the gantry carriage 117 that engage the conveyor structures on each side of the conveyor. With these arms clamping onto the conveyor structure in opposed directions, the gantry carriage 117 becomes securely locked to the conveyor such as to allow the entire gantry carriage to maneuver laterally along the floor mounted tracks and to remain positively located to the skillet on which the vehicle subassembly is located, regardless of line speed changes. The carriage electric motor drives 131 can be adapted to put light pressure against the skillet in "torque mode" to assist the conveyor drive, and minimize towing forces on the conveyor engaged structures.

By way of example, and not as a limitation, utilization of a pair of synchronized variable frequency driven vector duty AC motor drives would be sufficient. In the specific enablement of the present invention shown and described, the use of vector duty variable speed electric motors (such as, for example of ~7.5 HP) of on each side of the gantry 117 may be used for urging of the gantry carriage assisting the conveyor drive. When used in conjunction with heavy duty gear boxes, the rotation of sprockets along a stationary chain that span the length of each track result in a synchronized drive on both floor mounted tracks on either side of the line in a manner that prevents prevent racking or skewing during lateral motion. Such linear actuation of the entire gantry allows linear tracking in a manner that positively locates the gantry 117 relative to the skillet line 120. The inclusion of linear encoders (not shown) on each side of the gantry, such as one on each floor track 122 and one on each motor driven chain arrangement (not shown), may be used to directly measure position and provide positioning feedback and control. In addition to assisting the conveyor drive during forward motion, the encoders and VFD drives are used for providing a self propelled motion to the carriage back up the line to return to a "home" position and position the carriage for the robots to pick and place glass from the existing urethane cells. Such controlled lateral movement may be both synchronized with the motion of the skillet line, as well as be independent therefrom.

The robot coordinated gantry carriage 117 will begin tracking with the assembly vehicle 135 when the vehicle enters the work cell or assembly station 100. It is expected that a vehicle enter the work cell 100, the gantry carriage 117 would initiate lateral movement by mechanically latching on to a conveyor structure, matching the line speed regardless of subsequent starts or stops. Vehicle lift and locating arms 130 are mounted on the moving carriage 117 for location of the bottom of the vehicle. These arms 130 lift the vehicle in order to clear supporting and locating details that positions the workpiece onto the skillet. Clearance need only be nominal, such as approximately 1" to 2", in order to create an independence from the skillet line 120 itself. When retracted in the lowest position, the arms 130 will clear the vehicle 135 and skillet 120, and a lifting motion may be actuated via pneumatic cylinders and slides such that once lifted, rod locks and check valves can secure the vehicle 135 in the event of an air loss. The pneumatically actuated arms that pivot in front of the skillet to tow the carriage down the line also positively locate the robot gantry carriage 117 to the skillet 120, both fore and aft. An arm 130 may then will pivot in from each side of the gantry 117 in order to prevent the tendency to rack or skew the gantry carriage. Skillet locating and tracking arms 132 maintain the position of the moving carriage 117 to coordinate with the movement of the skillet, maintaining the identification of the indexing details for purposes of reconnecting the vehicle to line, as is described in greater detail below.

In the presently enable configuration, the use of six (6) lift and locate arms, such as three (3) mounted on each side of the gantry carriage 117, where only two (2) lifts are utilized on each side of the vehicle sub-assembly depending on the length of the model in station, would be sufficient to raise to lift the vehicle in order to take positional control of the vehicle. The workpiece (herein, a vehicle 135) and carriage 117 mounted robots 115, 118, at this point, are now fixtured to the same frame, thus eliminating movement relative to one another creating a virtual stop station.

Control of the carriage motion may be either independent of or synchronized with the skillet. In such a configuration, design choices of specific arms may be selected that may actuate toward the rear of the vehicle to accommodate different vehicles.

With the workpiece fixtured to the gantry carriage 117, independent assembly operations may now be performed in the mode of a "virtual" stop station but without the need to stop or slow the skillet line 120. A vision system 160 mounted to the robot's end effector or directly to the carriage may then be used to measure the glass openings, determine the correct gap and flush, install the glass, and then gauge the margins. The use of an automatic vision system 160 is used to guide the industrial robots in order to reliably center the component, herein a windshield glass, in a manner that is center reliably and accurately gapped and flushed. By way of example, and not meant as a limitation, the selection of a vision system 160 such as provided by the INOS division of Variation Reduction Solutions, Inc. (VRSI) of Plymouth, Mich. may be use to measure the margins of the glass after decking to gauge final fit. After the glass is installed the robots will retract to their clear of line positions and the lifting arms will then lower the vehicle back onto the skillet conveyor details.

As shown and described in use with an Automatic Glass Decking Cell 100, such a configuration may also consist additionally of: specialized end effectors 165 for use with the vision system; a front glass reject shuttle 170; a rear glass reject conveyance and shuttle 190; and a front glass pick transfer conveyor 200.

The end effectors 165 are intended to be of a specific design tailored for the workpiece, in this example one specifically for front windshield glass 165a and one specifically for back glass 165b. Additionally, the end effectors 165 are adapted for specific use with the vision system 160. By way of example, when used in conjunction with a VRSI INOS Vision System, each end effector 165 may incorporate six (6) INOS camera vision systems for scanning and accurately positioning each respective glass. Each end effector 165 may include a rigid frame to which are rigidly mounted vacuum cups and location details mounted on adjustable mounting brackets. Vacuum switches associated with each vacuum cup may be used to detect a vacuum loss and to ensure that a good seal has been achieved prior to maneuvering the glass. Vacuum cups may further utilize vacuum trap vacuum locks with incorporated vacuum blow off.

Such a vision system 160 is intended to accurately scan and locate the edges of the glass 150 during the glass pick routine and to send an offset to a robot 115, 118 to center a glass 150 onto the end effector 165. An estimated cycle time of 6 seconds is needed to transfer the glass into place. During the glass decking routine, the INOS vision system 160 will scan the windshield/back glass apertures to center the glass, gap, and flush the glass to the vehicle. Further still, an INOS system will perform a control measurement that measures the gap and flush of the decked glass 150 at all measurement locations that are candidates for a control measurement, i.e., such as, for example the body feature is not covered by the glass molding.

The front glass reject shuttle 180 is dedicated to the front glass robot and may travel along the gantry rail 122 in the unlikely event of a vision fault. During normal operation the reject shuttle will remain docked with the gantry carriage 117. In the event of a vision fault (decking or picking), then the robot will place the glass 150 onto the shuttle 180. Once a glass 150 is confirmed to be in position on the shuttle 180, the shuttle 180 will detach and utilize and independent drive to transfer the glass downstream into the safety isolated reject manual pick zone. An operator may enter through the outer zone to pick and manually deck glass.

The rear glass reject conveyance 190 and shuttle 192 is utilized to allow the rear glass robot 115 to reject glass 150 downstream. Intended as a conveyance 190 built into the robot gantry carriage super structure 117, the shuttle 192 will convey the glass from the robot (upstream) to the rear glass reject shuttle (downstream), the rear glass shuttle 192 may be of similar design as the front glass shuttle 180. One rear glass pallet 194 will utilize cushioned bumpers and/or vacuum cups (ported to atmosphere) to securely hold/grip the glass 150 during transportation. Also, edge guides loosely capture the edges of the glass to keep the glass secured during transportation.

Three zones are intended for operation of an electric motor driven roller conveyor for transfer the rear glass pallet from the rear glass robot (upstream) to the downstream end of the robot gantry carriage. These include:

Zone 1: On top of the Gantry Carriage super structure;
Zone 2: On the vertical Pallet Drop Lifter; and
Zone 3: On top of the rear glass Reject Shuttle Carriage.

Pneumatically actuated clamps may be utilized to secure the position of the pallet 194 during transfers in each zone. Pallet presence detection sensors will be utilized to determine the position of the pallet. A pallet drop lifter mounted to the gantry super structure lifts and lowers the pallet from the robot place height to the reject shuttle height. The lifter carriage can be pneumatically actuated and guided via a vertical slide.

The front glass pick transfer conveyor 200 is further provided as a motor driven slat conveyor for transferring the front glass 150 from the existing robot drop off point in the windshield urethane cell to the pick point of the front glass decking robot at the home position of the gantry carriage 117. Sensors detect the presence of glass at both ends, and locating details mounted to the slat conveyor securely locate the glass during transfer. Such a configuration allows both the front and rear glass decking robots to simultaneously pick glass from the home position, thus reducing cycle time.

The above detailed description is provided and intended to enable and teach a preferred embodiment of the present invention. However, as indicated, the specific application is not necessarily limiting of the scope the broad range of equivalence of the subject matter of the claims. It is intended that the features on functions of the present invention may be enabled in the automation of other manufacturing and assembly line processes outside the present description and are an addition to the preferred embodiments of the present invention. As further provided, the following description of the operation of the preferred embodiment may further indicate inventive element of the present invention that may also be transferrable to other assembly line manufacturing improvements otherwise within the broad range of equivalence of the current inventive concept.

2. Operation of the Preferred Embodiment

The operation of the present invention is best described below. In the general operation of the invention a vehicle subassembly virtual stop station operates independently of other assembly line operations. The vehicle is conveyed to the gantry carriage, and is transferred to the gantry carriage tow arms that engage with independent conveyor skillet support details for the vehicle subassembly to rest on directly. The gantry carriage begins to be towed down the assembly line synchronizing with the assembly line conveyor. Clamp arms directly opposing the tow arms on each side of the line grips the conveyor component that the vehicle subassembly rests on, or the vehicle subassembly directly to eliminating backlash between the line tracking carriage and the assembly line.

The line tracking carriage maintains coordination with the assembly line conveyor regardless if it runs continuous, or starts and stops during the assembly process performed by the Robotic Virtual Stop Station System.

A lift raises the vehicle subassembly off the assembly line conveyor. At this point the vehicle subassembly and robots, and vision sensors relative motion is zero in all six degrees of freedom, and the subassembly process is preformed while the Robotic Virtual Stop Station is conveying down the assembly line.

Once the assembly process is completed, the lifts on each side of the line lower the vehicle subassembly back down onto the assembly line conveyor. The clamp arms retract, and then the tow arms retract disengaging the line tracking carriage from the either a conveyor component that the vehicle subassembly rests on, or the vehicle subassembly directly, thus the line tracking carriage no longer is synchronized with the assembly line, and stops Once clear of the vehicle the coordinated robotic gantry will disengage from the skillet and return home. Once the carriage is home, the robots will use the vision guidance to center and pick the next glass and repeat the cycle.

Further, in the event of a rejected glass assembly, the operation of system is describe in conjunction with FIG. 5a through FIG. 5e in which In the event of a rejected installation of rear glass, FIG. 5a depicts the assembly robot accessing a rejected rear glass element and placing in on a rear glass pallet. The pallet is then transferred from a home zone, Zone 1, to a drop lifter Zone 2 as shown in conjunction with FIG. 5b. The drop lifter subsequently lower the glass to the reject shuttle level as shown in FIG. 5c, and rejected rear glass is conveyed from the drop lifter Zone 2 to a shuttle zone of Zone 3, as shown in FIG. 5d. Finally, as shown in FIG. 5e, the rejected shuttle detaches and drives the rejected glass to a reject pick zone outsize of the flow of the ordinary assembly operations.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Claims appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. In a manufacturing assembly line having a work piece indexed to and moving with a conveyor such that said work piece is advanced along said assembly line for sequential assembly of constituent components, wherein the improvement comprises:
   a carriage mounted about said manufacturing assembly line and capable of movement independent of said conveyor;
   at least one lifting mechanism anchored to said carriage and adapted for transferring said workpiece between said assembly line and said carriage;
   a secondary indexing mechanism for fixturing the work piece to said carriage in a manner eliminating relative motion between said workpiece and said carriage; and
   at least one automated sequential assembly mechanism for progressing the assembly of the workpiece and the indexed carriage independent of said assembly line;
   wherein said lifting mechanism being further adapted to return the workpiece back to an original indexed point on said conveyor.

2. The manufacturing assembly line of claim 1, wherein said carriage is adapted to be mechanically connected to said conveyor for synchronizing movement of said carriage to movement of said conveyor.

3. The manufacturing assembly line of claim 1 forming a virtual stop station in which movement of said carriage is independent of movement of said conveyor and is provided by a motorized drive mechanism, said virtual stop station further comprising at least one guide rail for providing guidance for back and forth movement of said carriage.

4. The manufacturing assembly line of claim 3, wherein said virtual stop station further comprises a pair of parallel rails mounted laterally about said conveyor.

5. The manufacturing assembly line of claim 1, wherein said automated sequential assembly mechanism comprises a robotic assembly device.

6. The manufacturing assembly line of claim 5, wherein said automated sequential assembly mechanism further comprises a vision guidance system for programmable controlling operation of said robotic assembly device, said vision guidance system affixed to said carriage in a manner to allow for no relative motion between a camera and said carriage.

7. The manufacturing assembly line of claim 5, further comprising a position coordinator in communication with said conveyor and with said carriage for coordinating relative motion between said carriage and said conveyor as said conveyor moves along a length of the assembly line, said position coordinator including:
   a sensor configured to sense the position of the conveyor and to generate a position signal corresponding to the sensed position;
   a processor configured to receive the position signal and to selectively provide a coordination signal in response to the position signal; and
   an actuator configured to receive the coordination signal and to coordinate the movement of the conveyor with the movement of the carriage in response thereto, wherein said coordination at least results in guiding said at least one lifting mechanism to return the workpiece back to an original indexed point on said conveyor and thereby creating substantially no relative change in position between the work piece and the conveyor when the work piece is returned to the assembly line from when the work piece is removed from the assembly line.

8. The manufacturing assembly line of claim 7, wherein said position coordinator further includes a mechanical stabilizer coupled with the actuator; and wherein the actuator is configured to extend the mechanical stabilizer between the conveyor and the carriage in response to the position signal.

9. The manufacturing assembly line of claim 8, wherein said sensor further comprises a vision guidance system for providing a position signal.

10. The manufacturing assembly line of claim 9, wherein the sensor further comprises an encoder.

11. A manufacturing assembly line comprising:
   a linear conveyor for moving a work piece between sequential assembly operations;
   said work piece being indexed to a first predicable position point on said conveyor such that as said conveyor travels linearly between sequential assembly operations coordinates on said work piece are identifiable in three dimensions; and
   a virtual stop station adapted for:
      removing said workpiece from said first predictable position point;
      indexing said workpiece to a second predictable position point relative to a carriage such that monitoring and control of said second predictable position point is independent of monitoring and control of said first predictable position point in a manner eliminating relative motion between said workpiece and said carriage;
      performing at least one additional assembly operation to said workpiece while said workpiece is removed from said first predicable position point on said conveyor and under independent control on said carriage and indexed to said second predictable position point; and
      returning said workpiece back to said first predictable position point;
   wherein a lateral movement of said carriage is independent from but concomitant with a lateral motion of said conveyor.

12. The manufacturing assembly line of claim 11, wherein a relative motion of said workpiece while indexed to said first predictable position point is independent of a relative motion of said workpiece while indexed to said second predictable position point.

13. The manufacturing assembly line of claim 12, wherein control of said workpiece while indexed to said first predictable position point is independent of control of said workpiece while indexed to said second predictable position point.

14. A manufacturing assembly line comprising:
   a linear conveyor for moving a work piece between sequential assembly operations;
   said work piece being indexed to a first predicable position point on said conveyor such that as said conveyor travels linearly between sequential assembly operations coordinates on said work piece are identifiable in three dimensions; and
   a virtual stop station adapted for:
   removing said workpiece from said first predictable position point;
   indexing said workpiece to a second predictable position point relative to a carriage such that monitoring and control of said second predictable position point is independent of monitoring and control of said first predictable position point;
   performing at least one additional assembly operation to said workpiece while said workpiece is removed from said first predicable position point on said conveyor and under independent control on said carriage and indexed to said second predictable position point, wherein said at least one additional assembly operation is performed at least in part by a robotic assembly device that is physically and operationally controlled by said carriage; and returning said workpiece back to said first predictable position point.

15. The manufacturing assembly line of claim 14, wherein a lateral movement of said carriage is independent from but concomitant with a lateral motion of said conveyor.

16. The manufacturing assembly line of claim 15, wherein a relative motion of said workpiece while indexed to said first predictable position point is independent of a relative motion of said workpiece while indexed to said second predictable position point.

17. The manufacturing assembly line of claim 16, wherein control of said workpiece while indexed to said first predictable position point is independent of control of said workpiece while indexed to said second predictable position point.

18. The manufacturing assembly line of claim 14, wherein a relative motion of said workpiece while indexed to said first predictable position point is independent of a relative motion of said workpiece while indexed to said second predictable position point.

19. The manufacturing assembly line of claim 18, wherein control of said workpiece while indexed to said first predictable position point is independent of control of said workpiece while indexed to said second predictable position point.

20. The manufacturing assembly line of claim 14, wherein said virtual stop station further comprises lifting arms mounted on said carriage for transferring physical control of said workpiece between said conveyor and said carriage and subsequently back to said conveyor.

21. The manufacturing assembly line of claim 20, said lifting arms are in operational control with a vision guidance system capable of identifying and tracking said workpiece.

22. A manufacturing assembly line comprising:
   a linear conveyor for moving a work piece between sequential assembly operations;
   said work piece being indexed to a first predicable position point on said conveyor such that as said conveyor travels linearly between sequential assembly operations coordinates on said work piece are identifiable in three dimensions; and
   a virtual stop station adapted for:
      removing said workpiece from said first predictable position point;
      indexing said workpiece to a second predictable position point relative to a carriage such that monitoring and control of said second predictable position point is independent of monitoring and control of said first predictable position point, wherein
         a lateral movement of said carriage is independent from but concomitant with a lateral motion of said conveyor;
         a relative motion of said workpiece while indexed to said first predictable position point is independent of a relative motion of said workpiece while indexed to said second predictable position point; and
         control of said workpiece while indexed to said first predictable position point is independent of control of said workpiece while indexed to said second predictable position point;
      performing at least one additional assembly operation to said workpiece while said workpiece is removed from said first predicable position point on said conveyor and under independent control on said carriage and indexed to said second predictable position point; and
      returning said workpiece back to said first predictable position point;
   wherein at least one additional assembly operation is performed at least in part by a robotic assembly device that is physically and operationally controlled by said carriage.

23. The manufacturing assembly line of claim 22, wherein control of said workpiece while indexed to said second predictable position point is further provided by a vision guidance system in operational communication between said robotic assembly device and said conveyor.

24. The manufacturing assembly line of claim 22, wherein said virtual stop station further comprises lifting arms mounted on said carriage for transferring physical control of said workpiece between said conveyor and said carriage and subsequently back to said conveyor.

25. The manufacturing assembly line of claim 24, said lifting arms are in operational control with a vision guidance system capable of identifying and tracking said workpiece.

* * * * *